United States Patent
Hong et al.

(10) Patent No.: US 11,675,506 B2
(45) Date of Patent: Jun. 13, 2023

(54) STORAGE DEVICE SUPPORTING MULTI-TENANCY AND OPERATING METHOD THEREOF

(71) Applicant: Samsung Electronics Co., Ltd., Suwon-si (KR)

(72) Inventors: Junghyun Hong, Hwaseong-si (KR); Youngjin Cho, Seoul (KR); Younggeon Yoo, Seoul (KR); Chanho Yoon, Seoul (KR); Hyeokjun Choe, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/181,579

(22) Filed: Feb. 22, 2021

(65) Prior Publication Data

US 2021/0365193 A1    Nov. 25, 2021

(30) Foreign Application Priority Data

May 20, 2020   (KR) .................. 10-2020-0060622

(51) Int. Cl.
   *G06F 3/06*   (2006.01)
   *G06F 9/48*   (2006.01)

(52) U.S. Cl.
   CPC .......... *G06F 3/0631* (2013.01); *G06F 3/0605* (2013.01); *G06F 3/067* (2013.01); *G06F 3/0659* (2013.01); *G06F 9/4881* (2013.01)

(58) Field of Classification Search
   CPC .... G06F 3/0631; G06F 3/0605; G06F 3/0659; G06F 3/067; G06F 9/4881
   See application file for complete search history.

(56) References Cited

U.S. PATENT DOCUMENTS

| | | |
|---|---|---|
| 7,529,728 B2 | 5/2009 | Weissman et al. |
| 7,730,478 B2 | 6/2010 | Weissman |
| 8,112,445 B2 | 2/2012 | Weissman et al. |
| 8,543,566 B2 | 9/2013 | Weissman et al. |
| 8,583,587 B2 | 11/2013 | Warshavsky et al. |
| 8,996,837 B1 * | 3/2015 | Bono ............ G06F 3/0665 711/170 |
| 9,274,710 B1 | 3/2016 | Oikarinen et al. |
| 9,378,043 B1 | 6/2016 | Zhang et al. |
| 9,467,355 B2 | 10/2016 | Doering et al. |
| 9,792,062 B2 | 10/2017 | Kruglick |
| 9,898,317 B2 | 2/2018 | Nakil et al. |
| 9,971,671 B2 | 5/2018 | Inamdar et al. |

(Continued)

OTHER PUBLICATIONS

European Extended Search Report (EESR) dated Jun. 29, 2021 for corresponding EP Patent Application No. 21156254.1.

(Continued)

*Primary Examiner* — Nicholas J Simonetti
(74) *Attorney, Agent, or Firm* — Muir Patent Law, PLLC

(57) ABSTRACT

A storage device includes a plurality of non-volatile memories; a volatile memory; a computing device configured to perform an operation on data provided by the plurality of non-volatile memories; and a storage controller including a resource manager configured to receive information about priority of tenants from a host, and to dynamically set resources of the plurality of non-volatile memories, the volatile memory, and the computing device based on the priority.

21 Claims, 8 Drawing Sheets

(56) References Cited

U.S. PATENT DOCUMENTS

| | | |
|---|---|---|
| 10,146,936 B1 | 12/2018 | Khanduja |
| 10,275,558 B2 | 4/2019 | Tamir et al. |
| 10,284,486 B2 | 5/2019 | Thyagarajan et al. |
| 2014/0280970 A1* | 9/2014 | Pijewski ............... G06F 9/5011 709/226 |
| 2017/0264493 A1 | 9/2017 | Cencini et al. |
| 2018/0088992 A1 | 3/2018 | Davis et al. |
| 2018/0123939 A1 | 5/2018 | Raman et al. |
| 2019/0104029 A1 | 4/2019 | Bernat |
| 2019/0140913 A1 | 5/2019 | Bernat et al. |
| 2019/0370086 A1* | 12/2019 | Heilper ................. G06F 9/5094 |
| 2020/0050403 A1* | 2/2020 | Suri ...................... G06F 3/0659 |
| 2020/0089537 A1 | 3/2020 | Bahirat et al. |
| 2020/0322453 A1* | 10/2020 | Said .................... H04L 67/1097 |
| 2021/0152659 A1* | 5/2021 | Cai ......................... H04L 67/62 |

OTHER PUBLICATIONS

European Extended Search Report (EESR) dated Jun. 21, 2021 for corresponding EP Patent Application No. 21156254.1.

* cited by examiner

STORAGE DEVICE SUPPORTING MULTI-TENANCY AND OPERATING METHOD THEREOF

CROSS-REFERENCE TO RELATED APPLICATION

This application claims the benefit of priority to Korean Patent Application No. 10-2020-0060622, filed on May 20, 2020 in the Korean Intellectual Property Office, the disclosure of which is incorporated herein in its entirety by reference.

BACKGROUND

The technical idea of the inventive concept relates to a storage device and an operating method of the same, and more particularly, to a storage device supporting multi-tenancy and an operating method of the storage device.

Recently, with the development of semiconductor technology, the performance of computer processors has been highly improved, and with the development of multi-core processor technologies, an amount of work that is simultaneously performed on one computer server has increased significantly.

Accordingly, hundreds or thousands of computer servers are installed at one location of the Internet data center, and various and stable services (for example, web service, mail service, file service, video service, and cloud service) are provided to different service users.

However, as the number of tenants requesting a connection to the data center is rapidly increasing, the amount of load to be processed by the central processing unit of the data center is rapidly increasing, and accordingly, an issue of quality of service (QoS) of the service provided to the tenants has occurred. To address this issue, performing pre-processing for the services requested by the tenants at the storage device installed at the data center may be useful.

SUMMARY

The disclosed embodiments provide a storage device for satisfying quality of service (QoS) to a plurality of tenants by differently setting service levels of a computing resource, a volatile memory resource, and a non-volatile memory resource according to weights of the tenants, and an operating method of the storage device.

According to an aspect of the inventive concept, a storage device includes: a plurality of non-volatile memories; a volatile memory; a computing device configured to perform an operation on data provided by the plurality of non-volatile memories; and a storage controller including a resource manager configured to receive information about priority of tenants from a host, and to dynamically set resources of the plurality of non-volatile memories, the volatile memory, and the computing device based on the priority.

According to another aspect of the inventive concept, a storage device includes: a plurality of non-volatile memories; a volatile memory; a computing device configured to perform an operation on data provided by the plurality of non-volatile memories; and a storage controller including a resource manager configured to receive information about priority of a first tenant and a second tenant from a host, and to dynamically set resources of the plurality of non-volatile memories, the volatile memory, and the computing device based on the priority of the first tenant and the second tenant.

According to another aspect of the inventive concept, an operating method of a storage device includes a computing device and a storage controller, including: receiving information about priority of tenants from a host and information about a task type requested by a respective user of each tenant; and dynamically allocating hardware resource of the storage device to each tenant based on the priority and/or the task type.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the inventive concept will be described in detail with reference to the accompanying drawings.

Figure 1:
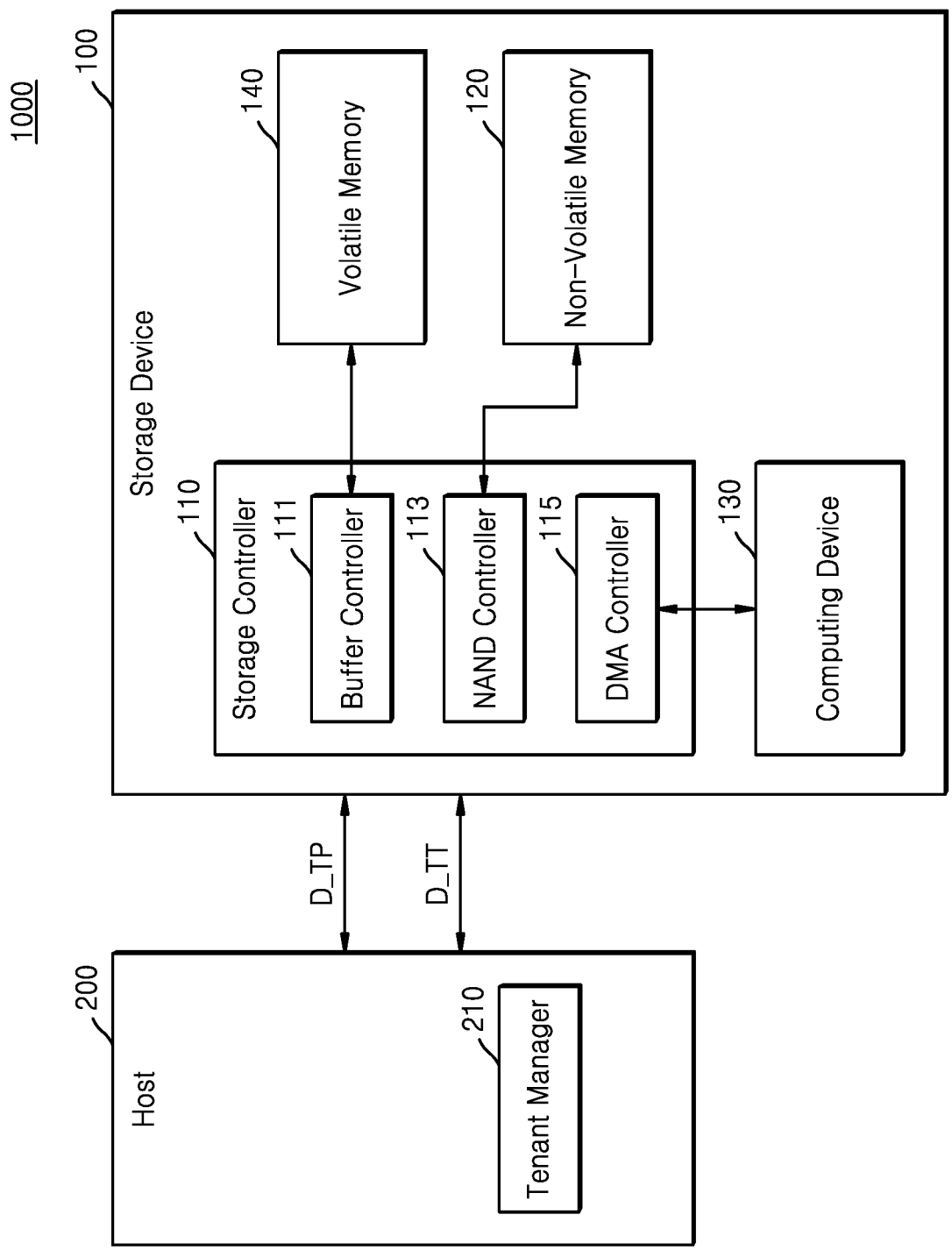
FIG. 1 illustrates an example of a data processing system, according to an embodiment of the inventive concept.

FIG. 1 illustrates an example of a data processing system 1000, according to an embodiment of the inventive concept.

Referring to FIG. 1, the data processing system 1000 may include a storage device 100 and a host 200.

In an embodiment, the data processing system 1000 may be embedded in an electronic device or implemented as an electronic device. The electronic device may be implemented as, for example, a personal computer (PC), a data server, an ultra-mobile PC (UMPC), a workstation, a netbook, a network-attached storage (NAS), a smart television, an internet of things (IoT) device, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, or the like.

In an embodiment, the host 200 may manage all operations of the data processing system 1000. The host 200 may store data in the storage device 100, and read data from the storage device 100. For example, the host 200 may transmit a write command and write data to the storage device 100 or transmit a read command to the storage device 100. In addition, the host 200 may allocate tasks and data to the storage device 100, and control the storage device 100 to perform tasks by using data processing. For example, the host 200 may transmit to the storage device 100 a data processing command for performing tasks together with data to be processed in the storage device 100, or transmit to the storage device 100 the data processing command for data previously stored in the storage device 100.

The host 200 may be implemented as a central processing unit (CPU), a processor, a microprocessor, an application processor (AP), or the like. In an embodiment, the host 200 may be implemented as a system-on-chip (SoC).

According to an embodiment, the host 200 may include a tenant manager 210. The tenant manager 210 may store and modify information about a plurality of tenants managed by the host 200. As an example, the information about the plurality of tenants may include an identification (ID) assigned to each of the plurality of tenants, and include information about the priority of each of the plurality of tenants. The tenant manager may be implemented with a combination software (or firmware) and hardware. As is traditional in the field of the disclosed technology, certain features and embodiments are described, and illustrated in the drawings, in terms of functional blocks, units and/or modules (e.g., tenant manager 210 and other such units). Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

The tenant manager 210 may identify the tenant to which a user who has requested a task to the host 200 belongs. For example, when each of a plurality of users requests a task, the tenant manager 210 may transmit to the storage device 100 the information about the ID and priority of the tenant which includes each of the plurality of users. Each tenant may be associated with and may have one or more users, and therefore each user may be assigned to a particular tenant. Accordingly, an ID and priority of a tenant may correspond to an ID and priority for each user associated with that tenant. A tenant, as described herein, refers to a particular group, or classification, to which a plurality of users belong, and may be an organization, a company, or other entity. A tenant may have an ID, which is common to the plurality of users associated with the tenant.

However, in the above-described embodiment, it is described that the host 200 transmits information about the ID and priority of the tenant of the user who has requested the task, to the storage device 100 including the tenant manager 210, but the inventive concept is limited thereto. According to various embodiments, the storage device 100 may include the tenant manager 210. In this case, the host 200 may simply receive a task request from the user, and transmit the task request to the storage device 100. Based on the received task request, the storage device 100 may transmit to the storage controller 110 information about the ID and priority of the tenant D_TP including the user who has requested the task.

According to various embodiments, the tenant manager 210 may include a tenant management table (TMT). For example, the TMT may be as shown in the following table.

TABLE 1

| Tenant ID | Configuration User | Priority |
|---|---|---|
| Tenant A | User 1, . . . user M | 2 |
| Tenant B | User 2, . . . User Y | 2 |
| Tenant C | User 3, . . . User L | 1 |
| . . . | . . . | . . . |
| Tenant N | User R, . . . User D | N |

Referring to Table 1, the TMT may map an store information about configuration of users included in (e.g. assigned to) the tenant and the priority of the tenant, with respect to the plurality of tenants. In response to receiving the task request, the tenant manager 210 may load the TMT, and identify in which tenant a user requesting the task is included and the priority of the tenant. Thereafter, the tenant manager 210 may transmit information about the tenant ID and priority D_TP to the storage controller 110. The storage controller 110 may adjust resources for a task requested by a user based on the tenant priority.

In addition, according to various embodiments, the tenant manager 210 may be implemented as a hypervisor. The hypervisor may be referred to as a virtual machine monitor or a virtual machine manager, as a logical platform for simultaneously executing a plurality of operating systems which are operated for each tenant. The hypervisor may be implemented using a combination of software (or firmware) and hardware.

The storage device 100 according to an example embodiment of the inventive concept may include the storage controller 110, a non-volatile memory 120, and a computing device 130. For example, the storage device 100 may include a printed circuit board on which the storage controller 110, the non-volatile memory 120, and the computing device 130 are disposed. In some embodiments, the storage device 100 may be enclosed within a casing, and/or may be included within a server or other computer. The storage device 100 may store data or process data in response to a command from the host 200. The storage device 100 according to an embodiment of the inventive concept may be implemented as a storage acceleration platform that accelerates data processing by storing and processing data internally. For example, the storage device 100 may include a solid state drive (SSD), a smart SSD, an embedded multimedia card (eMMC), an embedded universal flash storage (UFS) memory device, a UFS memory card, a compact flash (CF) card, a secure digital (SD) card, a micro-SD card, a mini-SD card, an extreme digital (xD) card, or a memory stick.

The non-volatile memory 120 may store data. The non-volatile memory 120 may store data provided by the host 200 or data provided by the computing device 130. The non-volatile memory 120 may include a memory cell array (MCA) including non-volatile memory cells capable of maintaining stored data even when the storage device 100 is powered off, and the MCA may be divided into a plurality of memory blocks. The plurality of memory blocks may have a two-dimensional (2D) horizontal structure in which the memory cells are two-dimensionally arranged on the same plane (or layer), or a three-dimensional (3D) vertical structure in which non-volatile memory cells are three-dimensionally arranged. The memory cell may include a single-level cell (SLC) storing one bit of data or a multi-level cell (MLC) storing two or more bits of data. However, the inventive concept is not limited thereto, and each memory cell may include a triple-level cell (TLC) for storing 3-bit data or a quadruple-level cell (QLC) for storing 4-bit data.

In some embodiments, the non-volatile memory 120 may include a plurality of dies, each of which includes an MCA, or may include a plurality of chips. Each die may be formed from a semiconductor wafer. For example, the non-volatile memory 120 may include the plurality of chips, and each of the plurality of chips may include the plurality of dies. The non-volatile memory 120 may be in the form of a package or memory module. In an embodiment, the non-volatile memory 120 may also include a plurality of channels each including the plurality of chips.

In an embodiment, the non-volatile memory 120 may include a NAND flash memory device. However, the inventive concept is not limited thereto, and the non-volatile memory 120 may include a resistive memory device such as resistive random access memory (RAM) (rRAM), phase change RAM (PRAM), or magnetic RAM (MRAM). Hereinafter, in the inventive concept, the non-volatile memory 120 is described on an assumption that the non-volatile memory 120 is a NAND flash memory device.

The computing device 130 may include a device that performs data processing on received data, and may perform a task assigned by the host 200. In an embodiment, the computing device 130 may perform data processing on the received data, for example, on input data in parallel by driving an application. The computing device 130 may include hardware (or firmware) and software. The application may include a plurality of data operations related to task performance, for example, arithmetic operations, convolution operations, polling operations, or the like. For example, when the computing device 130 performs a neural network-based task, the application may include a neural network model. The neural network model may include a plurality of data operations, inputs, output sizes, weights, biases, or the like of the plurality of data operations, based on at least one of a convolution neural network (NN) (CNN), a region (R) CNN (R-CNN), a region proposal network (RPN), a recurrent neural network (RNN), a stacking-based (S) deep neural network (DNN) (S-DNN), a state-space (S-S) dynamic (D) NN (S-SDNN), a deconvolution network, a deep belief network (DBN), a restricted Boltzmann machine (RBM), a fully convolutional network, a long short-term memory (LSTM) network, a classification network, and various types of neural networks.

As one example, the computing device 130 may be implemented with a graphics processing unit (GPU), a digital signal processor (DSP), a field programmable gate array (FPGA), an application specific integrated circuit (ASIC), and a neural processing unit (NPU). However, the inventive concept is not limited thereto, and the computing device 130 may be implemented with various types of acceleration circuits (accelerators) that perform data processing required to perform an assigned task, for example, to perform data operations in parallel. In some example embodiments, the computing device 130 may also include software and/or firmware associated with hardware.

The storage controller 110 may manage all operations of the storage device 100, and may control the non-volatile memory 120 and the computing device 130 to perform an operation according to a command received from the host 200. For example, in response to a write or read command from the host 200, the storage controller 110 may control the non-volatile memory 120 to write data DT therein or read data therefrom, and may control an erase operation of the non-volatile memory 120. In addition, the storage controller 110 may control major operations of the non-volatile memory 120 such as garbage collection, bad block management, read reclaim, and read replacement, and may control power of the non-volatile memory 120.

In addition, the storage controller 110 may control the computing device 130 to perform a task. The storage controller 110 may provide data and/or applications received from the host 200 or stored in the non-volatile memory 120 to the computing device 130. The storage controller 110 may configure or adjust an operating environment of the computing device 130. In particular, when the computing device 130 performs tasks requested by the plurality of users, the storage controller 110 may dynamically manage resources of the computing device 130 for each user.

Figure 2:
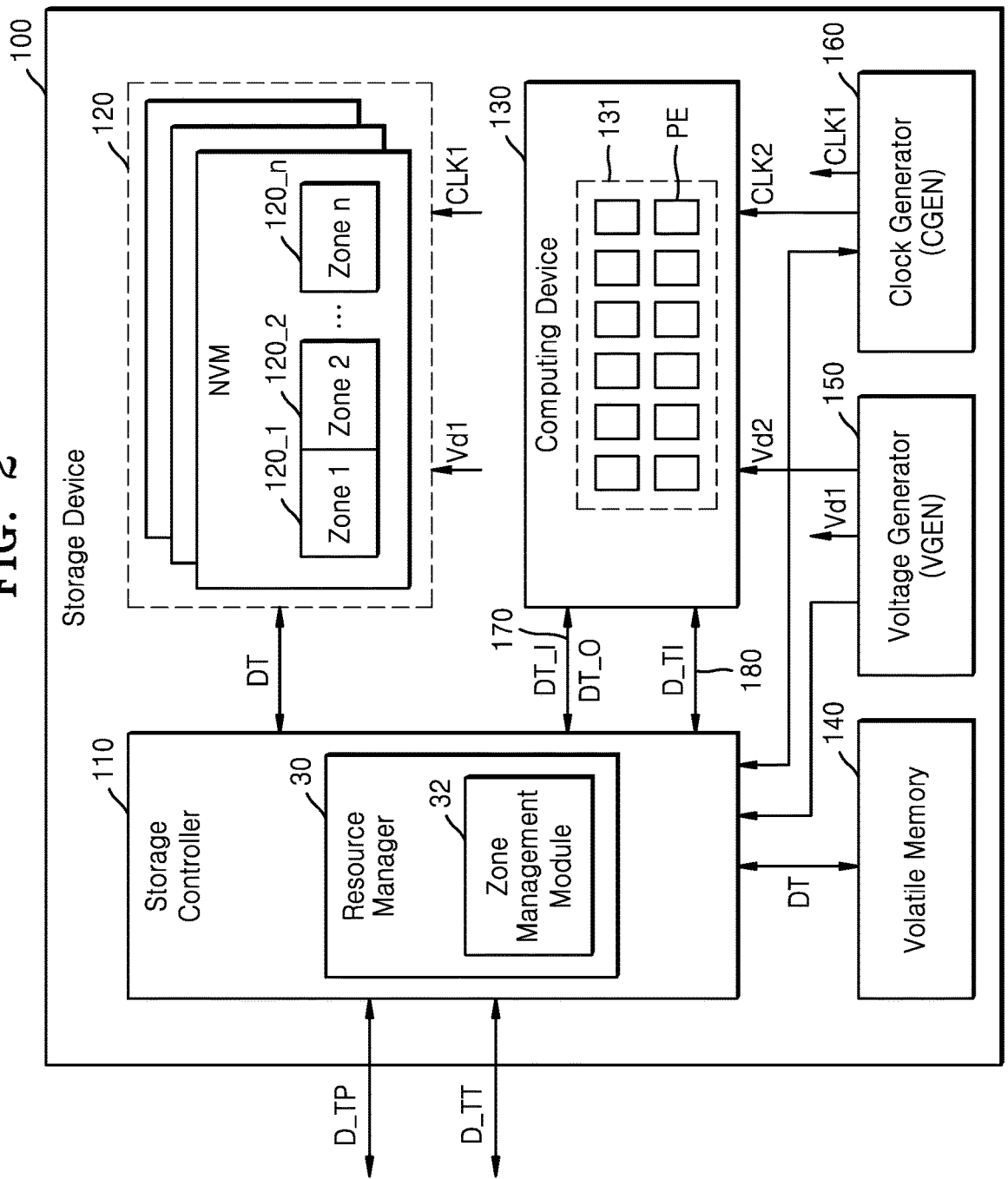
FIG. 2 is a block diagram of a storage system according to an example embodiment of the inventive concept.

FIG. 2 is a block diagram of the storage device 100 according to an example embodiment of the inventive concept.

Referring to FIG. 2, the storage device 100 may include the storage controller 110, the non-volatile memory 120, the computing device 130, a volatile memory 140, a voltage generator (VGEN) 150, and a clock signal generator (CGEN) 160. Duplicate descriptions of the storage controller 110, the non-volatile memory 120, and the computing device 130 given with reference to FIG. 1 are omitted.

The volatile memory 140 may operate as a buffer temporarily storing the data DT in the storage device 100. The volatile memory 140 may store the data DT received from the host 200 or read from the non-volatile memory 120, and may also store data generated by the computing device 130, for example, a task performance result, such as output data DT_O of the computing device 130. For example, when the computing device 130 performs a task based on the data DT stored in the non-volatile memory 120, the storage controller 110 may read the data DT from the non-volatile memory 120, and store the data DT in the volatile memory 140. When the computing device 130 performs a task, the storage controller 110 may transmit the data DT stored in the volatile memory 140 to the computing device 130 as input data DT_I. When the task performance of the computing device 130 is completed, the storage controller 110 may temporarily store the task performance result, for example, the output data DT_O of the computing device 130, in the volatile memory 140, and may transmit the output data DT_O to the host 200 at the request of the host 200.

The volatile memory 140 may be implemented as a volatile memory such as DRAM or static RAM (SRAM). However, the inventive concept is not limited thereto, and the volatile memory 140 may be implemented as a resistive non-volatile memory such as magnetic RAM (MRAM), phase change RAM (PRAM), and resistive RAM (ReRAM), or as various types of non-volatile memories such as a flash memory, nano floating gate memory (NFGM), polymer RAM (PoRAM), and ferroelectric RAM (FRAM). In the present embodiment, the volatile memory 140 is illustrated to be provided outside the storage controller 110, but the embodiment is not limited thereto, and the volatile memory 140 may be also provided inside the storage controller 110.

The voltage generator 150 may generate various voltages used in the storage device 100. For example, the voltage generator 150 may be implemented as a power management integrated circuit (PMIC) or a power management unit (PMU). The voltage generator 150 may generate voltages based on an external voltage provided from the outside of the storage device 100, for example, an external voltage provided by the host 200. In an embodiment, the voltage generator 150 may generate a driving voltage of the non-volatile memory 120, which may be described as a first driving voltage Vd1 and a driving voltage of the computing device 130, which may be described as a second driving voltage Vd2, and may provide the first driving voltage Vd1 and the second driving voltage Vd2 to the non-volatile memory 120 and the computing device 130, respectively. The voltage generator 150 may adjust voltage values of the first driving voltage Vd1 and/or the second driving voltage Vd2 based on the control of a resource manager 30.

The CGEN 160 may generate various clock signals used in the storage device 100. For example, the CGEN 160 may be implemented as an oscillator, a phase locked loop (PLL), a delayed locked loop (DLL), or the like. The CGEN 160 may generate a clock signal used in the non-volatile memory 120, which may be described as a first clock signal CLK1 and a clock signal used in the computing device 130, which may be described as a second clock signal CLK2. The CGEN 160 may adjust frequencies of the first clock signal CLK1 and/or the second clock signal CLK2 under the control of the resource manager 30.

The resource manager 30 may receive information about the tenant priority and/or information about an assigned task type, and based on these pieces of information, may differentially allocate a plurality of resources according to each of the plurality of tenants. The plurality of resources may include a resource of the computing device 130 (for example, a processing element PE in FIG. 2), a resource of the volatile memory 140, and a resource of the non-volatile memory 120.

As an example, the resource manager 30 may allocate resources of the computing device 130 according to the tenant priority and the requested task type. The resource manager 30 may receive information about the tenant priority D_TP from the host 200, and identify the priority of each of the plurality of tenants. For example, when both a first user included in a tenant A and a second user included in a tenant B simultaneously request to perform tasks, the resource manager 30 may allocate the resources of the computing device 130 in proportion to the tenant priority.

As another example, the resource manager 30 may allocate resources of the computing device 130 according to the requested task type. The resource manager 30 may identify the QoS based on the task type requested by the host 200. For example, the QoS required by the task of the first user included in the tenant A may be less than the QoS required to perform the task of the second user included in the tenant B. Depending on the embodiment, even when the priority of the tenant B is lower than that of the tenant A, the QoS of the task requested by the second user included in the tenant B may be considered. In this manner, the resource manager 30 may allocate resources of the computing device 130 in proportion to the QoS of the task.

According to an embodiment, the resource manager 30 may further include a zone management module 32. The zone management module 32 may be implemented using software (or firmware) and hardware. The zone management module 32 may manage first through $n^{th}$ zones 120_1 through 120_n included in the non-volatile memory 120, and support a function of processing various requests for the first through $n^{th}$ zones 120_1 through 120_n. In an embodiment, the zone management module 32 may set the non-volatile memory 120 to the first through $n^{th}$ zones 120_1 through 120_n, according to a management command received from the host. The zone management module 32 may differently set an area for storing data for each tenant, based on tenant management information provided by the host 200. For example, the zone management module 32 may set the non-volatile memory 120 into the first zone 1201 (zone 1) storing data for the users included in the tenant A, and into the second zone 120_2 storing data for the users included in the tenant B.

Referring to FIG. 1 together, as described above, when the computing device 130 is performing a task, the resource manager 30 of the storage controller 110 may receive in real time the information about the tenant priority D_TP and the information about the task type from the tenant manager 210 of the host 200, and based on these information, may dynamically manage the resources of the computing device 130.

The storage controller 110 may include other components of the storage device 100, for example, the non-volatile memory 120, the computing device 130, the volatile memory 140, the VGEN 150, and the CGEN 160. The storage controller 110 may control write and read operations of the non-volatile memory 120 and control data processing of the computing device 130, in response to the command CMD from the host 200.

In an embodiment, the resource manager 30 may determine the number of processing elements that are activated for each tenant among a plurality 131 of processing elements PE included in the computing device 130. In this case, the processing element PE may include an operation circuit that processes a unit operation, and may be implemented as, for example, a core of a central processing unit (CPU), an arithmetic logic unit (ALU) of a graphics processing unit (GPU), a look-up table (LUT) of a field programmable gate array (FPGA), block RAM (BRAM), or a digital signal processor (DSP).

The resource manager 30 may transmit to the computing device 130 a tenant index D_TI indicating the number of activated processing elements for each tenant. Accordingly, the computing device 130 may receive the tenant index D_TI, and dynamically change the number of processing elements that perform data processing for each tenant, for the plurality of tenants.

In an embodiment, a first path P1 170 and a second path P2 180 may be provided between the storage controller 110 and the computing device 130, and data such as the input data DT_I and the output data DT_O may be transceived via the first path P1 170, and various control signals including state information IF_S and a power control signal CS_PM may be transceived via the second path P2 180. Different interface methods may be applied to the first path P1 170 and the second path P2 180. As a non-limiting example, a peripheral component interconnection express interface (PCIe) method may be applied to the first path P1 170, and an inter-integrated circuit (IC2) interface method may be applied to the second path P2 180. However, the embodiments are not limited thereto, and the first path P1 170 and the second path P2 180 may be the same type of path to which the same interface method is applied.

In an embodiment, the resource manager 30 may adjust a transmission rate of transmitting the data DT to the volatile memory 140, based on the tenant priority information D_TP. The resource manager 30 may set the transmission rate of the data DT to be different for each tenant by adjusting the performance of an accelerator. For example, the resource manager 30 may receive a task request from a first user having a high tenant priority. The resource manager 30 may identify information about the tenant priority of the first user, and adjust the performance of the accelerator in proportion to the identified priority. Accordingly, data required for a task requested by a user of a tenant having a high priority may be transmitted quickly, and data required for a task requested by a user of a tenant having a relatively low priority may be transmitted slowly.

As described with reference to FIGS. 1 and 2, in the storage device 100, the storage controller 110 may construct an operation environment of the computing device 130, the non-volatile memory 120, and the volatile memory 140 according to the priority of each of the plurality of tenants, and may dynamically perform the QoS management.

When tasks requested by multiple users are performed according to the first-in first-out (FIFO) method without considering the priority of the tenants and the task types requested by the users, the QoS may not be satisfied even though the priority of the tenants are high. However, the storage device 100 according to an embodiment of the inventive concept may reallocate the resources of the storage device 100 in real time by considering the priority of the tenant and the task type requested by the user together, and accordingly, the QoS of the task requested by all users may be satisfied.

In addition, the storage device 100 according to an example embodiment of the inventive concept may, by performing a pre-processing of a task requested by a user in the storage controller 110, reduce an amount of data to be post-processed, and improve a workload of the host 200.

Figure 3:
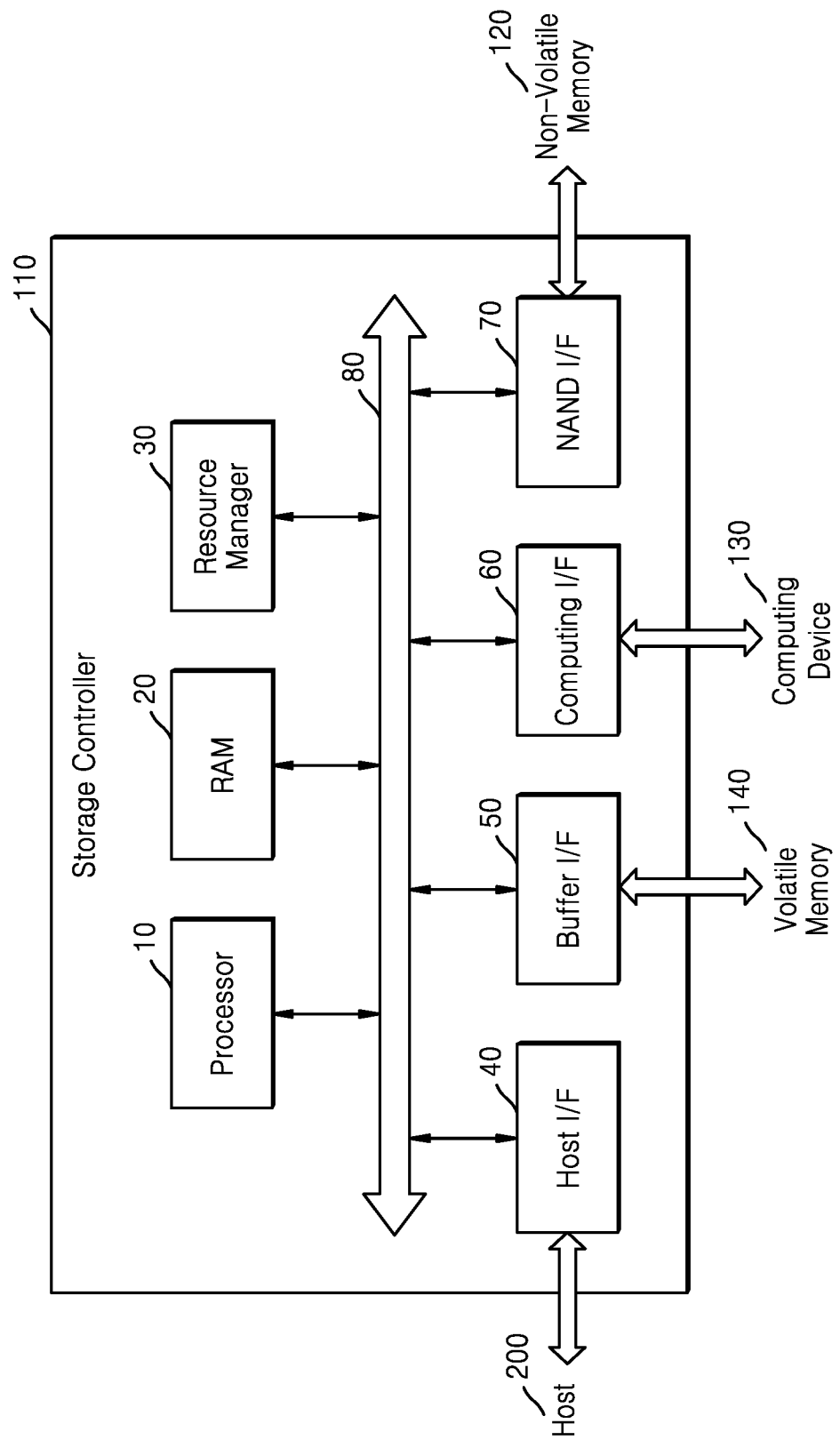
FIG. 3 is a block diagram of a storage controller according to an embodiment.

FIG. 3 is a block diagram of the storage controller 110 according to an example embodiment of the inventive concept.

Referring to FIG. 3, the storage controller 110 may include a processor 10, RAM 20, a resource manager 30, a host interface 40, a buffer interface circuit 50, a computing interface circuit 60, and a NAND interface circuit 70 (or a NAND flash interface circuit).

According to an embodiment, components of the storage controller 110, for example, the processor 10, the RAM 20, the resource manager 30, the host interface circuit 40, the buffer interface circuit 50, the computing interface circuit 60, and the NAND interface circuit 70 may communicate with each other via a bus 80.

According to an embodiment, the processor 10 may include the CPU, a microprocessor, or the like, and may control all operations of the storage controller 110. The processor 10 may be implemented as a multi-core processor, for example, a dual-core processor or a quad-core processor.

The RAM 20 may operate under a control of the processor 10 and may be used as a working memory, a buffer memory, a cache memory, or the like. For example, the RAM 20 may be implemented as a volatile memory such as DRAM and SRAM, or a non-volatile memory such as PRAM and a flash memory. The RAM 20 may store firmware and data for controlling the storage controller 110. The stored firmware and data may be driven or processed by the processor 10. A software layer structure of the storage controller 110 implemented as firmware may include an interface layer, a flash translation layer (FTL), or the like.

The resource manager 30 may dynamically manage resources of the storage device 100 including the storage controller 110. Based on the information about the tenant priority D_TP and the task type requested by the user D_TT, the resource manager 30 may perform adjustments of the number of computation elements activated in the computing device 130 for each task, a bandwidth of data to be output by the non-volatile memory 140, the performance of the accelerator of the volatile memory 140, or the like.

The resource manager 30 may be implemented as software (or firmware) or hardware. Alternatively, the resource manager 30 may be implemented as a combination of software and hardware. When the resource manager 30 is implemented as software, instructions of programs constituting the resource manager 30 may be loaded onto the RAM 20, and executed by the processor 10.

The host interface circuit 40 may communicate with the host 200 under the control of the processor 10. At least one of various interface methods such as universal serial bus (USB), advanced technology attachment (ATA), serial advanced technology attachment (SATA), parallel advanced technology attachment (PATA), serial attached small computer system interface (SCSI) (SAS), high speed interchip (HSIC), SCSI, peripheral component interconnection (PCI), PCI express (PCIe), universal flash storage (UFS), secure digital (SD), multimedia card (MMC), embedded MMC (eMMC), dual in-line memory module (MM) (DIMM), registered DIMM (RDIMM), load reduced DIMM (LRDIMM), enhanced small disk interface (ESDI), and integrated drive electronics (IDE) may be applied in the host interface circuit 40.

The buffer interface circuit 50 may provide an interface between the storage controller 110 and the volatile memory 140. Data DT to be stored in the nonvolatile memory 120, data DT read from the non-volatile memory 120, or the output data DT_O of the computing device 130 may be temporarily stored in the volatile memory 140 via the buffer interface circuit 150.

The computing interface circuit 60 may provide an interface between the storage controller 110 and the computing device 130. The computing interface circuit 60 may include an accelerator (not illustrated). The resource manager 30 may control the accelerator (not illustrated) to transmit data DT at a different transmission rate for each user. For example, the resource manager 30 may control a different transmission rate for each user by controlling an operating frequency clock of the accelerator.

Although not illustrated, the storage controller 110 is further provided with the ECC engine or the like for encoding data to be stored in the non-volatile memory 120 that stores code data for interfacing with the host 200 and for decoding data read from the non-volatile memory 120.

Figure 4:
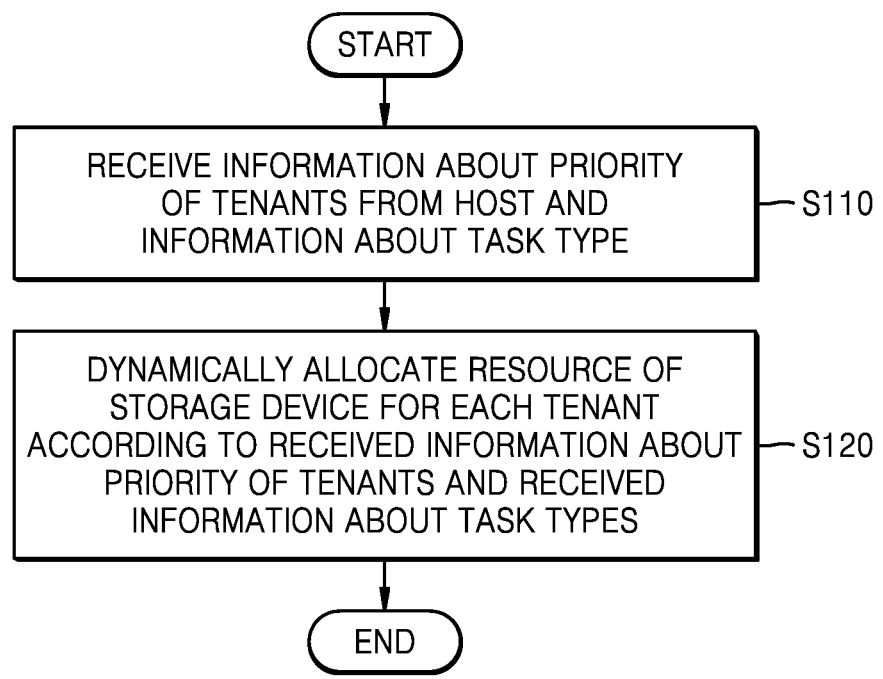
FIG. 4 is a flowchart of an operation of a resource manager, according to an example embodiment of the inventive concept.

FIG. 4 is a flowchart of an operation of the resource manager 30, according to an example embodiment of the inventive concept.

Referring to FIG. 4, the resource manager 30 may receive the tenant priority information D_TP and the task type information D_TT from the host 200 (S110).

Based on the received tenant priority information D_TP and task type information D_TT, the resource manager 30 may control the number of processing elements of the computing device 130 for performing the requested task, the bandwidth of the non-volatile memory 120, and the accelerator of the volatile memory 140 (S120).

As an example, the resource manager 30 may control the computing device 130 so that the requested task is quickly processed and the QoS is satisfied, by providing a lot of computational processing resources (for example, processing elements of the computing device 130 in FIG. 2) to the users included in the high-priority tenant.

As another example, the resource manager 30 may satisfy the QoS by dynamically allocating a wider bandwidth, when outputting data required for a user's task included in the high-priority tenant.

As another example, the resource manager 30 may dynamically manage the storage area of the volatile memory 140 by allocating the storage area for each tenant. The resource manager 30 may further include a page table for providing an independent address space for each tenant. The resource manager 30 may allocate the storage area of the volatile memory 140 as an independent area for each tenant, but may set the storage area to be proportional to the tenant priority. Alternatively, the resource manager 30 may control the input/output speed of data to/from the volatile memory 140 by controlling an accelerator included in the buffer interface circuit 50 for a connection to the volatile memory 140. Accordingly, the resource manager 30 may satisfy the QoS by dynamically setting the allocated space of the volatile memory 140 for a task request of the user corresponding to the tenant of the high priority of the volatile memory 140.

Figure 5:
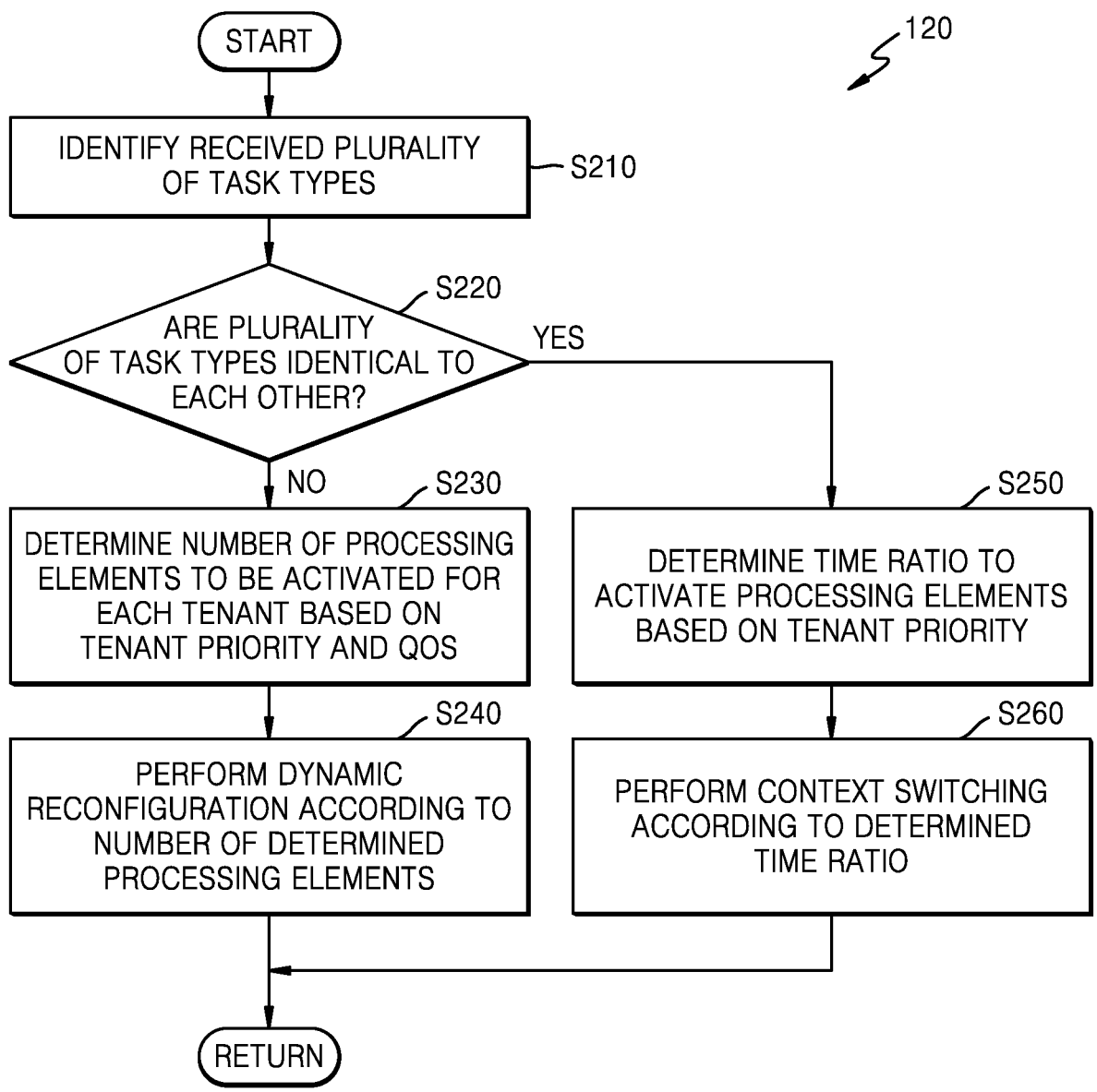
FIG. 5 is a flowchart of a resource manager dynamically allocating computing resources, according to an example embodiment of the inventive concept.

FIG. 5 is a flowchart of dynamically allocating computing resources by the resource manager 30, according to an example embodiment of the inventive concept.

Referring to FIG. 5, the resource manager 30 may identify a plurality of received task types (S210). The resource manager 30 may receive task type information about tasks requested by a plurality of users from the tenant manager 210 of the host 200. For example, the first user included in the tenant A may request a filtering task for searching for a first image, and the second user included in the tenant B may request a convolution task using a neural network, and the third user included in the tenant C may request a filtering task for searching for a second image. The resource manager 30 may identify a type of each of a first task corresponding to the first user (filtering), a type of a second task corresponding to the second user (convolution), and a type of a third task corresponding to the third user (filtering).

The resource manager 30 may determine whether any of the plurality of task types are the same (S220). The resource manager 30 may determine whether all the tasks requested at the present time point are of the same type. For example, at the current time point, when the first user and the third user other than the second user have requested the filtering task for image search, the resource manager 30 determines that the task types to be performed are the same. For another example, at the present time point, when the first user and the second user request tasks, because the type of the first task is filtering and the type of the second task is convolution, the resource manager 30 determines that the task types are different from each other.

The resource manager 30 may determine the number of processing elements to be activated for each task based on the tenant priority and the QoS (S230). When the plurality of tasks are different from each other, the resource manager 30 may differently set the number of processing elements to be activated for each task.

Figure 6A:
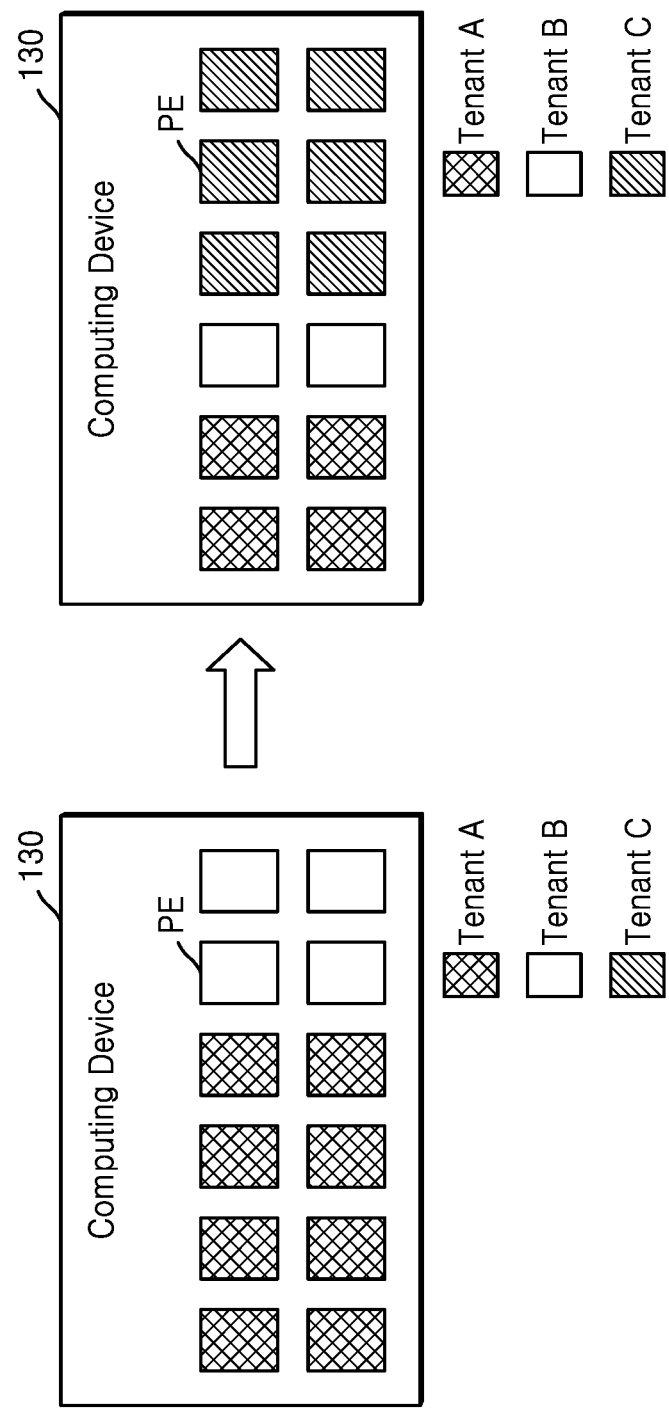
FIG. 6A illustrates an example of allocating computing resources when task types are different, according to an example embodiment of the inventive concept.

The storage device 100 may simultaneously perform the filtering task of the first user and the convolution task of the second user. In this case, the resource manager 30 may set the number of processing elements in proportion to the priority of the tenant A including the first user and the priority of the tenant B including the second user. Referring to FIG. 6A, the number of processing elements allocated to the tenant A may be eight, and the number of processing elements allocated to tenant B may be four. Because the priority of the tenant A is higher than that of the tenant B, the task requested by the first user included in the tenant A may be processed faster by allocating more processing elements. According to various embodiments, each processing element may include a number of cores or registers of a CPU, an arithmetic logic unit (ALU) of the GPU, the LUT of the FPGA, and block RAM, etc.

According to various embodiments, the resource manager 30 may determine the number of processing elements, further based on the QoS according to the task type. Although not illustrated in FIG. 6A, the resource manager 30 may allocate four processing elements to the tenant A and eight processing elements to the tenant B. The convolution operation of the second task may require higher complexity and a larger amount of computations than the filtering operation of the first task. As such, the QoS of the second task may have a larger value than that of the first task. Accordingly, to satisfy the QoS of both the first task and the second task, the resource manager 30 may set the number of processing elements for the convolution operation of the second task to eight, despite the low priority of the tenant B. In one embodiment, in this case, the type of task requested may take precedence over the tenant priority. But other arrangements may be used, such as allowing tenant priority to take precedence over task type, or using an algorithm that determines based on a combination of tenant priority, task type, and possibly other factors such as QoS, how to allocate resources such as processing elements, bandwidth, storage area, or speed, to the different requested tasks.

According to various embodiments, while the tasks for the first user and the second user are performed, the third user may request a task. In this case, the resource manager 30 may dynamically determine the number of processing elements considering the priority and the QoS of tasks of tenants to which the first through third users belong. Referring to FIG. 6A, when the third user of the tenant C requests a task, the resource manager 30 may change the number of processing elements for the tenant A and tenant B. For example, the resource manager 30 may identify that the priority ratio of the tenants A through C is about 2:1:3, newly allocate six of the processing elements of the computing device 130 to perform the third task, reduce the number of processing elements for performing the first task from 8 to 4, and reduce the number of processing elements for performing the second task to two.

The resource manager 30 may perform dynamic reconfiguration according to the determined number of processing elements (S240). For example, the computing device 130 may be implemented as the FPGA. The resource manager 30 may dynamically reconfigure the computing device 130 according to the number of processing elements determined for each tenant. The dynamic reconfiguration may be referred to as changing each processing element to an intellectual property (IP) optimized to perform the requested task. For example, the computing device 130 may convert the processing elements each to perform the filtering operation, the convolution operation, and the filtering operation, by using the dynamic reconfiguration. For example, the processing elements that perform the filtering operation may be reconstructed as DSP blocks, and the processing elements that perform convolution operations may be reconstructed as accelerators dedicated for the convolution operation.

The resource manager 30 may determine a time ratio of activating the processing elements based on the tenant priority (S250). The resource manager 30 may use the processing elements by applying time-division, when all of task types are the same. For example, when the first user and the third user simultaneously request tasks, the resource manager 30 may determine that the task types are the same. The reason may be that the filtering operation is commonly requested, although the first user has requested a task of searching for a first image (for example, an animal image) and the second user has requested a task of searching for a second image (for example, a fruit image).

The resource manager 30 may determine a time ratio of activating the processing elements based on the tenant priority. For example, the resource manager 30 may perform an operation by allocating a large amount of time to a task request corresponding to a tenant with a high priority, and perform an operation by allocating a small amount of time to a task request corresponding to a tenant with a low priority. For example, when the ratio of the priority of the tenant A and the tenant C is about 2:3, the ratio of the time to perform the first task and the time to perform the third task may be also set to about 2:3.

Figure 6B:
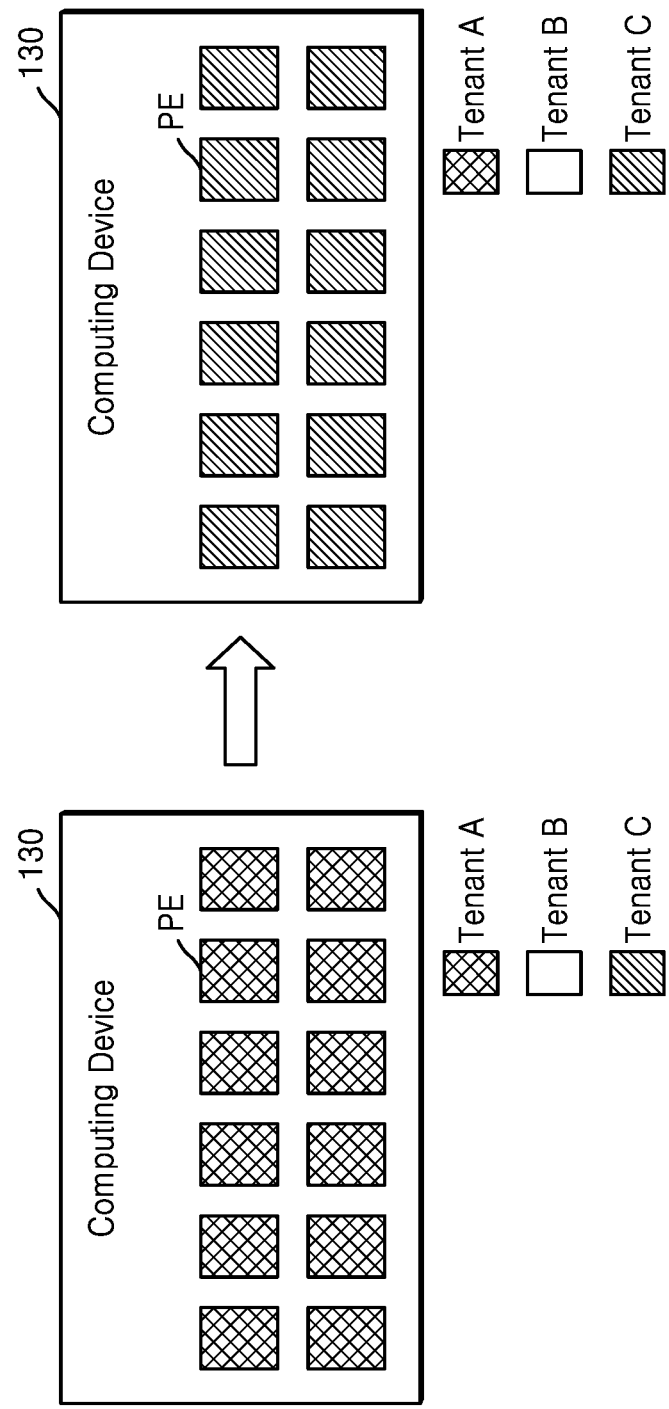
FIG. 6B illustrates an example of allocating computing resources when task types are the same, according to an example embodiment of the inventive concept.

The resource manager 30 may perform a context switching operation according to the determined time ratio (S260). The context switching operation may be referred to as changing a register value (context) without changing the IPs of processing elements. For example, the computing device 130 may perform the context switching operation between the first task and the third task. For example, the first task and the third task may commonly correspond to the filtering operation for the image searching, but because only filtering targets are different, the same filtering operation may be performed by changing only the register value. Referring to FIG. 6B, the computing device 130 may perform filtering (for example, the animal image) for the first task requested by the tenant A in all processing elements. Thereafter, according to the time ratio determined in operation S250, when a certain time has elapsed, the computing device 130 may perform the filtering (for example, the fruit image) for the third task requested by tenant C by performing the context switching operation.

Figure 7:
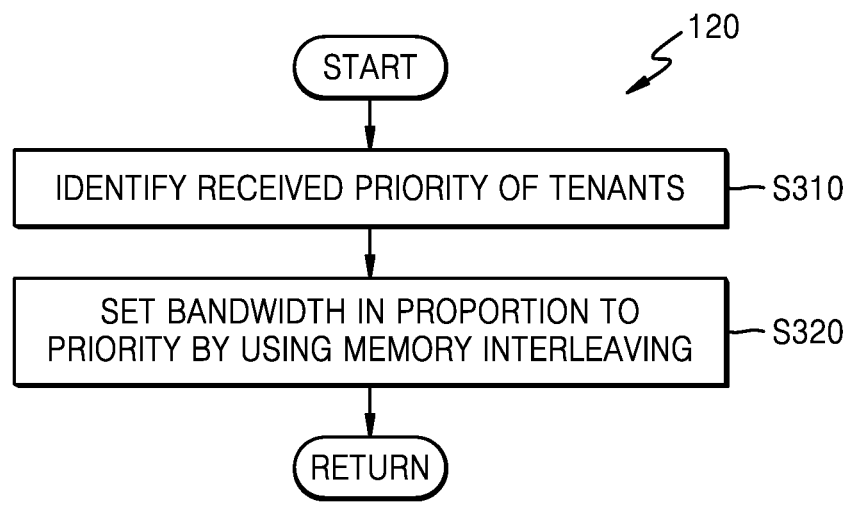
FIG. 7 is a flowchart of an operation of a resource manager, according to an example embodiment of the inventive concept.

FIG. 7 is a flowchart of dynamically allocating resources of the non-volatile memory 140 by the resource manager 30, according to an example embodiment of the inventive concept.

Referring to FIG. 7, the resource manager 30 may identify the received priority of the tenants (S310). As described above, when the first through third users request tasks, the resource manager 30 may identify the priority of the tenants A through C in which the first through third users are respectively included. For example, as described above, the ratio of the priority of the tenants A through C may correspond to about 2:1:3.

The resource manager 30 may dynamically configure a bandwidth in proportion to the priority by using a memory interleaving operation (S320). In the case of a multi-channel NAND flash memory, the resource manager 30 may perform the interleaving operation in proportion to the priority of the tenants. For example, as described above, when the priority ratio of the tenants A through C corresponds to about 2:1:3, the channel bandwidth for data input/output may also be set to the ratio of about 2:1:3. By performing the interleaving operation in proportion to the priority of the tenants, when a user belonging to a high priority tenant requests input/output of data, high input/output operations per second (IOPS) may be achieved. The interleaving may be performed across a plurality of memory blocks, banks, or chips of the multi-channel NAND flash memory to allow simultaneous access to a plurality of the memory blocks, banks, or chips for each task according to the ratio. Hardware and software configured to implement this interleaving may be referred to as an interleaver.

While the inventive concept has been particularly shown and described with reference to embodiments thereof, it will be understood that various changes in form and details may be made therein without departing from the spirit and scope of the following claims.

What is claimed is:

1. A storage device comprising:
a plurality of non-volatile memories;
a volatile memory;
a computing device configured to perform an acceleration operation on data provided by the plurality of non-volatile memories; and
a storage controller comprising a resource manager configured to receive information about priority of tenants from a host, and to dynamically set resources of the plurality of non-volatile memories, the volatile memory, and the computing device based on the priority,
wherein dynamically setting resources includes adjusting the acceleration operation based on the priority of tenants, and
wherein adjusting the acceleration operation includes adjusting an operation frequency clock of an accelerator in proportion to the priority of the tenants.

2. The storage device of claim 1, wherein the computing device comprises a plurality of computing elements, and
the resource manager is configured to differently allocate a number of computing elements for each tenant, based on information about the priority of the tenants and based on task types requested by users respectively associated with the tenants.

3. The storage device of claim 2, wherein the resource manager is configured to, when the task types requested by the users respectively associated with the tenants are identical to each other, allocate time in which the plurality of computing elements are activated, in proportion to the priority of the tenants.

4. The storage device of claim 3, wherein the resource manager is configured to, when the task types requested by the tenants are different from each other, allocate at least some of computing elements among the plurality of computing elements for each tenant, based on the information about the priority of the tenants and a value of quality of service (QoS) of the tasks requested by the users respectively associated with the tenants.

5. The storage device of claim 1, wherein each of the plurality of non-volatile memories comprises a plurality of zone memories, and
the resource manager is configured to allocate at least some of the plurality of zone memories for each tenant in proportion to the priority of the tenants.

6. The storage device of claim 5, wherein the resource manager is configured to set a bandwidth in proportion to the priority of the tenants by using interleaving.

7. The storage device of claim 1, wherein the resource manager is configured to divide and allocate a storage region of the volatile memory in proportion to the priority of the tenants.

8. An operating method of a storage device comprising a computing device and a storage controller, the method comprising:
receiving information about priority of tenants from a host and information about a task type requested by a respective user of each tenant; and
dynamically allocating hardware resources of the storage device to each tenant based on the priority and/or the task type by dynamically controlling the input/output speed of data to/from the storage device by controlling an accelerator included in a buffer interface circuit of a volatile memory of the storage device in proportion to the priority and/or based on the task type.

9. A storage device comprising:
a plurality of non-volatile memories;
a volatile memory;
a computing device configured to perform an acceleration operation on data provided by the plurality of non-volatile memories; and
a storage controller comprising a resource manager configured to receive information about priority of a first tenant and a second tenant from a host, and to dynamically set resources of the computing device based on the priority of the first tenant and the second tenant,
wherein dynamically setting resources includes adjusting the acceleration operation performed by the computing device based on the information about the priority of the first tenant and the second tenant, and
wherein adjusting the acceleration operation includes adjusting an operation frequency clock of an accelerator in proportion to the priority of the first tenant and the second tenant.

10. The storage device of claim 9, wherein
the computing device comprises a plurality of computing elements, and
the resource manager is configured to divide and allocate the plurality of computing elements into at least some of computing elements for performing a first task requested by a user of the first tenant and at least some computing elements for performing a second task requested by the second tenant, based on information about priority of the first tenant and the second tenant and based on task types respectively requested by the user of the first tenant and a user of the second tenant.

11. The storage device of claim 10, wherein
the resource manager is configured to, when types of the first task and the second task are identical to each other, alternately activate the plurality of computing elements for a particular amount of time, and set the alternately activated time to be proportional to the priority of the first tenant and the priority of the second tenant.

12. The storage device of claim 11, wherein the resource manager is configured to, when types of the first task and the second task are different from each other, based on information about priority of the first tenant and the second tenant and values of quality of service (QoS) of the first tenant and the second tenant, allocate the plurality of computing elements to perform the first task by using a first set of the plurality of computing elements, and to perform the second task by using a second set of the plurality of computing elements.

13. The storage device of claim 9, wherein
each of the plurality of non-volatile memories comprises a plurality of zone memories, and
the resource manager is configured to differently allocate a number of the plurality of zone memories in proportion to the priority of the first tenant and the second tenant.

14. The storage device of claim 13, wherein the resource manager is configured to set a bandwidth in proportion to the priority of the first tenant and the second tenant, by using interleaving.

15. The storage device of claim 9, wherein the resource manager is configured to divide and allocate a storage region of the volatile memory in proportion to the priority of the first tenant and the second tenant.

16. The storage device of claim 8, wherein controlling the accelerator includes adjusting an operation frequency clock of the accelerator in proportion to the priority of the tenants.

17. The method of claim 8, wherein the dynamically allocating of the hardware resource further comprises:
determining whether task types requested by the respective users of the tenants are identical to each other; and
when the task types requested by the respective users of the tenants are identical to each other, allocating activated time for alternately activating a plurality of computing elements comprised in the computing device in proportion to the priority of the tenants.

18. The method of claim 17, wherein the dynamically allocating of the hardware resources further comprises, when the task types requested by the respective users of the tenants are different from each other, based on information about the priority of the tenants and values of quality of service (QoS) of the tasks requested by respective users of the tenants, allocating at least some of the computing elements among the plurality of computing elements for each respective user.

19. The method of claim 8, wherein each of plurality of non-volatile memories comprises a plurality of zone memories, and
the dynamically allocating of the hardware resources further comprises allocating at least some of the plurality of zone memories for each tenant in proportion to the priority of the tenants.

20. The method of claim 19, wherein the dynamically allocating of the hardware resources further comprises setting a bandwidth in proportion to the priority of the tenants, by using interleaving.

21. The method of claim 8, wherein the dynamically allocating of the hardware resources further comprises dividing and allocating a storage region of a volatile memory in proportion to the priority of the tenants.

* * * * *